US005782730A

United States Patent [19]

Kawasaki et al.

[11] Patent Number: 5,782,730

[45] Date of Patent: Jul. 21, 1998

[54] PRESSURE ROLLER

[75] Inventors: Hiroshi Kawasaki; Shigeru Maruyama, both of Tokyo, Japan

[73] Assignee: Arai Seisakusho Co., Ltd., Tokyo, Japan

[21] Appl. No.: 686,055

[22] Filed: Jul. 24, 1996

[30] Foreign Application Priority Data

Jul. 23, 1996 [JP] Japan .................................... 8-193544

[51] Int. Cl.[6] ........................................ B23P 15/00

[52] U.S. Cl. ........................................ 492/56; 492/59

[58] Field of Search ....................... 492/56, 59; 428/35.7, 428/36.5; 399/279

[56] References Cited

U.S. PATENT DOCUMENTS

| | | | |
|---|---|---|---|
| 4,083,092 | 4/1978 | Imperial et al. | 492/56 |
| 4,522,866 | 6/1985 | Nishikawa et al. | 492/56 |
| 5,610,695 | 3/1997 | Mizutani et al. | 492/56 |
| 5,640,662 | 6/1997 | Sugimoto et al. | 492/56 |

*Primary Examiner*—Irene Cuda

[57] ABSTRACT

A pressure roller is disclosed which comprises: a metal core; an elastic layer formed around the metal core; and a top layer provided over the elastic layer, the top layer having a thickness of not greater than 0.1 mm and being made of a fluororesin, the fluororesin having a coefficient of dynamic friction of 0.25 or more. The pressure roller is capable of forming a high quality image free of image failure and has excellent durability. The fluororesin having a coefficient of dynamic friction as high as 0.25 or more can be obtained by incorporation of a second component having high viscoelasticity into a fluororesin such as PFA, FEP, MFA or EPA.

6 Claims, 1 Drawing Sheet

PRESSURE ROLLER

FIELD OF THE INVENTION

The present invention relates to a pressure roller in a fixing system of a xerographic copying machine, laser beam printer or the like, in particular, it relates to a pressure roller used in a film fixing system.

BACKGROUND OF THE INVENTION

As a pressure roller in a fixing system of a xerographic copying machine, laser beam printer (hereinafter referred to as "LBP") or the like, a roller has been proposed to improve toner release properties which comprises a metal core, a rubber layer formed around the metal core, and a fluororesin top layer provided over the rubber layer.

Conventional rollers of this type are produced by a process comprising steps of inserting a sleeve made of a fluororesin into a cylindrical mold having a bore, which had an outer diameter smaller than the inner diameter of the cylindrical mold; fixedly attaching ends of the sleeve to the end plates of the mold by plugging the bore cavity with the end plates for holding a metal core concentrically with the bore; and filling the annular space thereby formed between the bore and the metal core with a molten rubber material under high pressure to expand the sleeve, thereby bringing the rubber-filled sleeve into contact with the inner wall of the cylindrical mold under pressure to unify the sleeve with the rubber material (see, U.S. Pat. Nos. 3,613,168 and 3,724,983).

The elastic layer may be made of a silicone sponge rubber. To form a top layer of a fluorocarbon polymer onto the surface of such a sponge rubber layer, according to Japanese Laid-Open Publication No. 6-266257, the silicone sponge rubber formed around the metal core has its surface coated with an adhesive such as an addition-reaction type silicone rubber, and the resultant is inserted into a sleeve and heated to fix the sleeve thereto.

Such conventional pressure rollers produced by the above described methods have problems. In particular, when such a pressure roller is used in a film fixing system, slippage is likely to occur between a film under image fixing and the pressure roller, thereby causing image failure. In a film fixing system, a roller using a silicone rubber having a high coefficient of dynamic friction as a top layer, or a roller comprising a silicone rubber layer having its surface coated with a mixture of a fluororubber with a fluororesin such as Dai-El Latex GLS-213 (Daikin Industries Ltd.), or the like is used as a pressure roller. However, these roller have a drawback that life as a roller is short because of poor toner releasing properties.

On the other hand, in a roller fixing system comprising a heating roller and a pressure roller, hardness of an elastic layer of the pressure roller is often designed to be very low in recent years. Accordingly, a fluororesin layer as a surface layer of the pressure roller and the elastic layer tends to be considerably different from each other in stiffness. This may cause image failure also in roller fixing system as in film fixing system.

SUMMARY OF THE INVENTION

The present invention has been made in view of these problems. It is, therefore, an object of the present invention to provide a pressure roller which is capable of forming a high quality image free of image failure and which has excellent durability.

To attain the above objective, the pressure roller according to the present invention comprises:

a metal core, an elastic layer formed around said metal core, and a top layer provided over said elastic layer, said top layer having a thickness of not greater than 0.1 mm and being made of a fluororesin, said fluororesin having a coefficient of dynamic friction of 0.25 or more.

The elastic layer is preferably made of a silicone rubber or silicone sponge rubber. Into the fluororesin, it is preferred to incorporate at least one member selected from the group consisting of a polyamide, polyester, thermoplastic fluororubber, tetrafluoroethylene-hexafluoropropylene copolymer (ETFE), tetrafluorethylene-hexafluoropropylene-vinylidene fluoride terpolymer (THV).

The fluororesin is preferably made of a tetrafluoroethylene-perfluoroalkyl vinyl ether copolymer (PFA), tetrafluoroethylene-hexafluoropropylene copolymer (FEP), tetrafluoroethylene-perfluoromethyl vinyl ether (MFA) or tetrafluoroethylene-hexafluoropropylene-perfluoroalkyl vinyl ether terpolymer (EPA).

According to the present invention constructed as described above, a fluororesin sleeve made of a fluororesin having a coefficient of dynamic friction of 0.25 or more, preferably 0.30 or more, more preferably 0.40 or more is used as the top layer covering the elastic layer formed around the metal core. By virtue of this, it is possible to provide a pressure roller which causes no image failure in film fixing and exhibits durability for a long period of time.

In addition, the above effects of the freedom from image failure in film fixing and the prolonged durability as a pressure roller are further enhanced by the use of the silicone rubber or silicone sponge rubber as the elastic layer, by the incorporation of at least one member selected from the group consisting of a polyamide, polyester, thermoplastic fluororubber, tetrafluoroethylene-hexafluoropropylene copolymer (ETFE), tetrafluorethylene-hexafluoropropylene-vinylidene fluoride terpolymer (THV) into the fluororesin, and by the use of the tetrafluoroethylene-perfluoroalkyl vinyl ether copolymer (PFA), tetrafluoroethylene-hexafluoropropylene copolymer (FEP), tetrafluoroethylene-perfluoromethyl vinyl ether (MFA) or tetrafluoroethylene-hexafluoropropylene-perfluoroalkyl vinyl ether terpolymer (EPA) as the fluororesin.

The pressure roller according to the present invention is constructed as described above and thereby capable of exhibiting the above functions. Therefore, the use of the pressure roller having a coefficient of dynamic friction of 0.25 or more successfully provides high quality images free from image failure and extremely improved durability.

DETAILED DESCRIPTION OF THE PREFERRED EMBODIMENTS

Now, embodiments of the present invention will be described with reference to the accompanying drawings.

Figure 1:
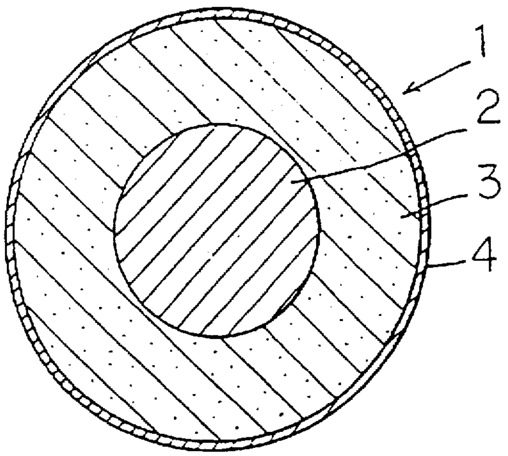
FIG. 1 shows a cross-sectional view of an embodiment of the pressure roller according to the present invention.

FIG. 1 shows an embodiment according to the present invention in section, which is incorporated as a pressure roller used in a fixing system of a copying machine.

The pressure roller 1 comprises a metal core 2, an elastic layer 3 made of a silicone rubber and formed around the metal core 2, and a top layer 4 covering the elastic layer 3 and made of a fluororesin having a high coefficient of dynamic friction.

To form the elastic layer 3, a silicone rubber composition is used which comprises 100 parts by weight of XE20-B0068 (trade name, manufactured by Toshiba Silicone Co., Ltd.) as a silicone rubber, 0.5 part by weight of TC-8 (trade name, manufactured by Toshiba Silicone Co., Ltd.) as a vulcanizing agent, and 1 part by weight of ME41-F (trade name of a red iron oxide silicone paste, manufactured by Toshiba Silicone Co., Ltd.) as a pigment.

Properties of the silicone rubber as the elastic layer 3, which was used in common for sample pressure rollers as Examples and Comparative Examples (referred to as E and C in Tables given below, respectively), in accordance with JIS K6301 are shown in Table 1. Coefficients of dynamic friction of the fluororesin top layers of the sample pressure rollers are shown in Tables 2 and 3.

TABLE 1

| | |
|---|---|
| hardness (JIS A) | 10 |
| tensile strength (MPa) | 0.4 |
| elongation (%) | 410 |
| tear strength (kN/m) | 3 |
| specific gravity | 1.01 |
| compression set (180° C. × 22 hrs, %) | 8 |

thermoplastic: Dai-El Thermoplastic T-530 (Daikin Industries, Ltd.)

ETFE: Neoflon ETFE EP-540 (Daikin Industries, Ltd.)

THV: THV 500G (Sumitomo 3M, Ltd.)

With respect to each of the samples as Examples and Comparative Examples, coefficient of dynamic friction was measured in accordance with ASTM D1894 e. The method in accordance with ASTM D1894 e will be described with reference to FIG. 2.

Figure 2:
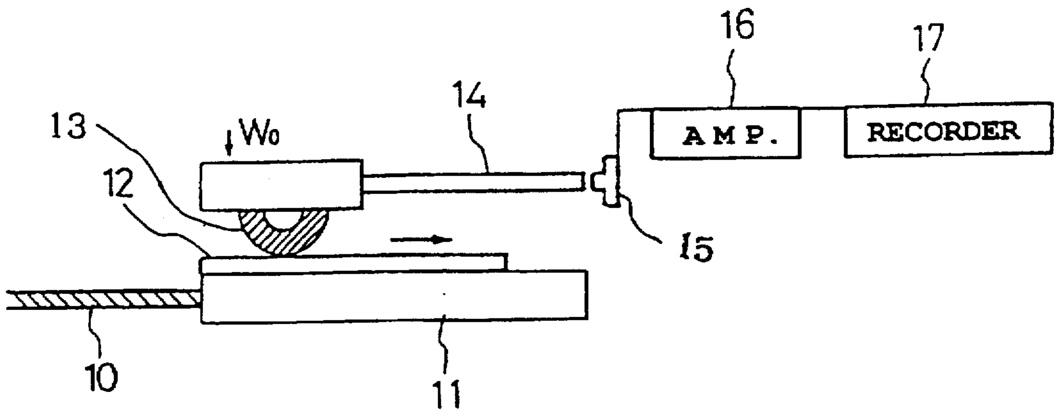
FIG. 2 is a schematic view illustrating a method for measuring a coefficient of dynamic friction.

A sheet of paper for PPC 12 is placed on a paper sheet bed 11 which is engaged with a threaded rod 10 rotationally driven by a motor (not shown) and which is movable to-and-fro by the rotation of the threaded rod 10. On the other hand, a sample roller 13 is cut from a pressure roller. The sample 13 is first placed on the PPC paper sheet 12 in such a manner that no substantial load is applied onto the PPC paper sheet 12, and then normal load $W_0$ is applied thereon. Consequently, normal load $W_0$ is exerted on the PPC paper sheet 12. In FIG. 2, reference number 14 represents a measuring rod fixedly attached to the sample 13, reference number 15 a distortion gauge on which the measuring rod 14 abuts, reference number 16 an amplifier, and reference number 17 a recorder.

The threaded rod 10 is rotated by the motor to move the bed 11 engaged therewith in the direction shown by arrow. In consequence of the movement of the bed 11, the sample 13 placed on the PPC paper sheet 12 placed on the bed 11 is moved together with the measuring rod 14. By this movement, the tip of the measuring rod 14 abuts on the distortion gauge 15. On the other hand, the bed 11 is further moved. As a result, the distortion gage 15 detects frictional force F. The frictional force F is low with respect to a sample having tendency to slide and high with respect to a viscoelastic sample. Accordingly, a coefficient of dynamic friction μ is derived from $W_0$ and F and represented by the formula: $\mu = F/W_0$, thereby enabling determination of the coefficient of dynamic friction μ.

TABLE 2

| Sample No. | | E1 | E2 | E3 | E4 | E5 | E6 | E7 | E8 | E9 | E10 |
|---|---|---|---|---|---|---|---|---|---|---|---|
| composition | FEP | 95 | 80 | 70 | 80 | | | | | | |
| of | PFA | | | | | 90 | 90 | 80 | | | |
| fluororesin | EPA | | | | | | | | 90 | | |
| (weight ratio) | MFA | | | | | | | | | 95 | 90 |
| | polyamide | | | | | | | | | | |
| | polyester | | | | | 10 | | | 10 | | |
| | thermoplastic | 5 | 20 | | | | 10 | 20 | | 5 | 10 |
| | ETFE | | | 30 | | | | | | | |
| | THV | | | | 20 | | | | | | |
| coefficient of dynamic friction | | 0.30 | 0.40 | 0.30 | 0.30 | 0.25 | 0.25 | 0.30 | 0.25 | 0.25 | 0.30 |

TABLE 3

| Sample No. | | E11 | E12 | E13 | E14 | C1 | C2 | C3 | C4 | C5 | C6 |
|---|---|---|---|---|---|---|---|---|---|---|---|
| composition | FEP | | | | | 100 | | | | | |
| of | PFA | | | | | | 100 | | | 95 | |
| fluororesin | EPA | | | | | | | 100 | | | 95 |
| (weight ratio) | MFA | 80 | 95 | 75 | 85 | | | | 100 | | |
| | polyamide | | 5 | | | | | | | 5 | 5 |
| | polyester | | | 25 | | | | | | | |
| | thermoplastic | 20 | | | | | | | | | |
| | ETFE | | | | | | | | | | |
| | THV | | | | 15 | | | | | | |
| coefficient of dynamic friction | | 0.40 | 0.30 | 0.30 | 0.30 | 0.20 | 0.15 | 0.15 | 0.20 | 0.20 | 0.20 |

Particulars on the fluororesins in Tables 2 and 3 are as follows.

FEP: Neoflon FEP NP-40 (Daikin Industries, Ltd.)

PFA: Neoflon PFA AP-230 (Daikin Industries, Ltd.)

EPA: Neoflon PFA SP-120 (Daikin Industries, Ltd.)

MFA: HYFLON MFA620 (Ausimont S.P.A., Italy)

polyamide: UBE Nylon 66 (Ube Industries, Ltd.)

polyester: Hytrel 4047 (Toray-Du Pont Co., Ltd.)

Image printing test was conducted on the sample rollers provided with a top layer made of a fluororesin having a coefficient of dynamic friction of 0.25 or more, preferably 3.0 or more, more preferably 4.0 or more (Examples 1 to 14) and the sample rollers provided with a top layer made of a fluororesin having a coefficient of dynamic friction lower than 0.25 (Comparative Examples 1 to 6).

In the image printing test, 100 sheets of paper for PPC are consecutively printed for each sample by means of Laser Writer 300 (manufactured by Apple Computer Japan Co., Ltd.) as an LBP. The printed images are examined and evaluated in terms of number of occurrence of image blur. The results of the image evaluation are shown in Tables 4 and 5.

TABLE 4

| Sample No. | E1 | E2 | E3 | E4 | E5 | E6 | E7 | E8 | E9 | E10 |
|---|---|---|---|---|---|---|---|---|---|---|
| image failure* | 0 | 0 | 1 | 1 | 2 | 1 | 0 | 2 | 1 | 0 |

*image failure: number of occurrence of image failure per consecutively printed 100 papers

TABLE 5

| Sample No. | E11 | E12 | E13 | E14 | C1 | C2 | C3 | C4 | C5 | C6 |
|---|---|---|---|---|---|---|---|---|---|---|
| image failure* | 0 | 0 | 1 | 0 | 6 | 20 | 20 | 7 | 12 | 10 |

*image failure: number of occurrence of image failure per consecutively printed 100 papers It is understood from Tables 4 and 5 that few image failures are observed with respect to the pressure roller samples using a fluororesin having a coefficient of 0.25 or more, no substantial image failures are observed with respect to those using a fluororesin having a coefficient of dynamic friction of 3.0 or more, and no image failure is observed at all with respect to those using a fluororesin having a coefficient of dynamic friction of 4.0 or more.

On the other hand, it is understood that image failures frequently occur with respect to those using a fluororesin having a coefficient of dynamic friction lower than 0.25.

Then, seventy thousand sheets of paper were consecutively printed to evaluate durability of each of the samples. Each of the samples showed no substantial change in frequency of occurrence of image failure even after the consecutive printing of seventy thousand sheets of paper and caused no substantial paper wrinkle or curl which may adversely affects image forming. Accordingly, each of the samples was found to have satisfactory durability.

Each of the pressure rollers used in the evaluation has an outer diameter of 15.8 mm, a thickness of the silicone rubber elastic layer of 3 mm, a thickness of the fluororesin top layer of 50 μm and a length of the elastic layer of 220 mm.

The fluororesin according to the present invention which has a coefficient of dynamic friction as high as 0.25 or more is obtained by mixing a highly viscoelastic secondary component with a known fluororesin such as PFA, FEP, MFA or EPA.

There is no particular restriction with respect to the secondary component, as long as it can be mixed with such a conventional fluororesin and has a relatively high coefficient of dynamic friction. For example, however, urethanes are not desirable because of their poor heat resistance.

As examples of the secondary component used in the present invention, there may be mentioned polyamide resins such as a nylon 6, nylon 66, nylon 8 (N-methoxymethyl nylon), nylon 11 and nylon 12; polyamide-based thermoplastic elastomers such as UBE-PAE (Ube Industries, Ltd.), Pebacks (Elf Atochem Co., Ltd., France) and NOVAMID PAE (Mitsubishi Chemicals Co., Ltd.); polyester resins such as a polyethylene terephthalate and polybutylene terephthalate; polyester elastomers such as Hytrel (Toray-Du Pont Co., Ltd.) and Pelprene (Toyobo Co., Ltd.); thermoplastic fluororubbers such as Dai-El Thermoplastic (Daikin Industries, Ltd.) and Cefral Soft (Central Glass Co., Ltd.); a tetrafluoroethylene-ethylene copolymer (hereinafter referred to as ETFE); and a tetrafluoroethylene-hexafluoropropylene-vinylidene fluoride terpolymer (hereinafter referred to as THV).

In the present invention, there is no particular restriction with respect to the type of the rubber used as the elastic layer 3. For the pressure roller, however, a vinyl group-containing organopolysiloxane composition, i.e., a silicone rubber is generally used. A silicone sponge rubber is also used, if desired.

As the silicone rubber, there may be used those vulcanizable with a conventional peroxide vulcanizing agent such as 2,5-dimethyl-2,5-di(tert-butylperoxy)hexane. Examples of commercially available silicone rubbers include DY32-420U, DY32-421U, DY32-422U, DY32-576U, DY32-623U, DY32-910U and DY32-911U (Dow.Corning Toray Silicone Co., Ltd.); KE520U, KE7019U and KE7020U (Shin-Etsu Chemical Co., Ltd.); TSE221-3U and TSE270-4U (Toshiba Silicone Co., Ltd.); and EL5251, EL5308 and EL5508 (Wacker Chemicals East Asia Ltd.).

As the silicone sponge rubber, there may be used KE901U, KE903U or KE904FU (Shin-Etsu Chemical Co., Ltd.); or XE21-A9915 (Toshiba Silicone Co., Ltd.) in the presence of a foaming agent such as azobisisobultyronitrile or 1,1-azobis(1-acetoxy-1-phenyl-ethane) and a vulcanizing agent.

To the elastic layer 3, various additives such as a reinforcer, filler, vulcanizing agent, coloring agent, conductive agent, heat resisting material and pigment may be added according to applications and design of the pressure roller.

There is no particular restriction with respect to the formulation of additives incorporated into the elastic layer 3. For example, however, approximately 10 to 300 parts by weight of a reinforcer and a fille are generally added to 100 parts by weight of a base rubber. As typical examples of the reinforcer, there may be mentioned carbon black, hydrated amorphous silica or anhydrous silica (fumed silica).

The hydrated amorphous silica is a reinforcer silica containing silicon dioxide ($SiO_2$), which may be produced by various method. For example, it is prepared by directly decomposing sodium silicate with sulfuric acid (direct method) or by reacting sodium silicate with a salt to form a salt of silicic acid and then decomposing the salt of silicic acid with sulfuric acid or carbon dioxide (indirect method). As commercially available hydrated amorphous silica, there may be mentioned Nipsil VN3 (Nippon Silica Industries Co., Ltd.), Carplex CS-5 (Shionogi & Co., Ltd.), Starsil S (Konoshima Chemical Co., Ltd.), Tokusil US (Tokuyama Corporation), Silton R-2 (Mizusawa Industrial Chemicals Co., Ltd.), Hisil 1223 (PPG Industries Inc., U.S.A.), Ultrasil VN3 (Degussa Corp., Germany), or Vulkasil S (Bayer AG, Germany). It is noted that those having a mean particle diameter of 30 μm or less, preferably 5 μm are used.

The anhydrous silica is a reinforcer silica containing silicon dioxide, which is produced by heat decomposition of a silicon halide; heat reduction of quarts sand, followed by air oxidation of vaporized SiO resulting therefrom; or thermal decomposition of an organosilicic compound. As commercially available anhydrous silica, there may be mentioned Aerosil 200 (Nippon Aerosil Co., Ltd.), Aerosil R972 (Nippon Aerosil Co., Ltd.), Cab-O-Sil MS-5 (U.S.A., Cabot Corporation), or Reolosil QS102 (Tokuyama Corporation). In the present invention, the hydrated amorphous silica and the anhydrous silica may be used in combination, if desired.

Further, a wetter may be added with a view to preventing a secondary bond due to surface activity of the silica. As the wetter, there may be mentioned silicone resins, alkoxysilanes and siloxanes, hydroxysilanes and siloxanes, silazanes, organic esters, and polyhydric alcohols.

The fillers are an indispensable element of the elastic layer 3 for maintaining mechanical properties of rubber, such as physical strength, hardness, compression set, which are essential to the functions of the elastic layer. As the fillers, there may be mentioned calcium carbonate, ground quartz, diatomaceous earth, zirconium silicate, clay (aluminum silicate), talc (hydrated magnesium silicate), wollastonite (calcium metasilicate), titanium oxide, zinc oxide, magnesium oxide, alumina (aluminum oxide), chromium oxide, red iron oxide, aluminum sulfate, barium sulfate, lithopone, molybdenum disulfide, mica, and graphite.

Various conductive agents may be used to impart electrical conductivity to the elastic layer, thereby bringing volume resistivity of the elastic layer to, for example, $10^{13}\Omega$*cm or less. The conductive agents include conductive carbon blacks such as acetylene black and Ketjen Black (Ketjen Black International Inc.); graphite; a powder of metal such as silver, copper or nickel; conductive zinc oxide; conductive calcium carbonate; and carbon fiber. Of these, carbon blacks are generally used.

In the present invention, a heat resisting material such as cerium oxide may be added. However, since the pressure roller of the present invention is not of the type prepared by coating a silicone rubber roller with a latex made of a mixture of a fluororubber with a fluororesin, such as Dai-El LatexGLS-213 (Daikin Industries, Ltd.), it is not necessary to subject the pressure roller to baking at a temperature of approximately 300° to 320° C. Accordingly, a heat resisting material such as cerium oxide may not necessarily be added.

A pressure roller made of a silicone rubber is often colored in red. In this case, a red iron oxide is generally used as a coloring agent. As the red iron oxide, there may be used those for coloring a rubber which are prescribed in SRIS (The Society of Rubber Industry, Japan, Standard) 1108. When orientation of the coloring agent is critical during processing, a spherical grade of red iron oxide having a mean particle size of 0.3 μm or less, such as Byferrox 130M (Bayer AG, Germany) may be added to the silicone rubber in an amount of approximately 0.2 to 2% by weight. Recently, the coloring agent is added frequently in the form of a silicone masterbatch in view of good dispersion and prevention of scattering. For example, CP-21 (Dow Corning Toray Silicone Co., Ltd.) containing approximately 50% of a coloring agent is added to the silicone rubber in an amount of 0.3 to 4% by weight.

As the vulcanizing agent used in the present invention, when the silicone rubber is of a heat curing type, organic peroxides for vulcanizing a silicone rubber may usually be used. Such organic peroxides include benzoyl peroxide, 2,4-dichlorobenzoyl peroxide, dicumyl peroxide, di-tert-butyl peroxide, tert-butyl perbenzoate, p-monochlorobenzoyl peroxide, 2,5-dimethyl-2,5-di(tert-butyl peroxy) hexane, tert-butyl cumyl peroxide, tert-butyl peroxy-2-ethyl hexanoate, tert-butyl peroxyisopropyl carbonate, 1,1-bis(tert-butyl peroxy)-3,3,5-trimethyl cyclohexane, and tert-butyl peroxy 3,5,5-trimethyl hexanoate. Of these, dicumyl peroxide or 2,5-dimethyl-2, 5-di (tert-butyl peroxy)hexane is generally used. It is, of course, possible in the present invention to use heat curable organopolysiloxane compositions of an addition reaction type comprising a vinyl group-containing organosiloxane, an organohydrogenpolysiloxane and a platinum catalyst, instead of the above-mentioned heat curing type compositions using organic peroxides.

If desired, a conductive agent such as a conductive carbon black may be added to the fluororesin used in the present invention to obtain a conductive fluororesin having volume resistivity of $10^{13}\Omega\times$cm or less. A pressure roller may be formed using the conductive fluororesin.

In the present invention, bonding between a sleeve for the top layer 4 made of a fluororesin such as PFA, FEP, MFA or EPA and the silicone rubber is effected by applying a silane-based adhesive such as Chemlok 607 (U.S.A., Lord Corporation) to the inner surface of the fluororesin sleeve which has been subjected to inner surface activation, and bringing the elastic layer 3 made of a silicone rubber into contact with the sleeve, followed by vulcanization of the resultant.

As a method for the activation of the inner surface of the sleeve made of a fluororesin such as PFA, FEP, MFA or EPA, there may be mentioned a method comprising chemical treatment with a solution prepared by dissolving metallic sodium and naphthalene in THF (tetrahydrofuran) such as TETRA-ETCH (JUNKOSHA Corporation) or in ethylene glycol dimethyl ether, a method comprising chemical treatment with a solution prepared by dissolving metallic sodium in liquid ammonia, a method comprising chemical treatment with an amalgam of mercury with an alkali metal such as lithium, an electrolytic reduction method, a corona discharge treatment method, a method comprising treatment with a plasma of an inert gas such as helium or argon, or a method comprising treatment with an eximer laser.

The metal core 2 and the elastic layer 3 may be bonded together using a silicone-based adhesive such as primer No. 16 (Shin-Etsu Chemical Co., Ltd.). In this connection, the metal core 2 is preliminarily surface-treated with a sand blast or the like and degreased with methylene chloride or the like, and then an adhesive is applied to the surface of the metal core, and if necessary, baking is conducted at about 130° C. for about 30 minutes.

The present invention has been described with reference to the preferred embodiments. It is, however, to be understood that the present invention is by no means restricted to the above embodiments, and that many changes or modifications may be made according to need.

What is claimed is:

1. A pressure roller comprising:

a metal core, an elastic layer formed around said metal core, and a top layer provided over said elastic layer, said top layer having a thickness of not greater than 0.1 mm and being made of a fluororesin, said fluororesin having a coefficient of dynamic friction of 0.25 or more.

2. The pressure roller according to claim 1, wherein said elastic layer is made of a silicone rubber or a silicone sponge rubber.

3. The pressure roller according to claim 1 or 2, wherein said fluororesin is mixed with at least one member selected from the group consisting of a polyamide, a polyester, a thermoplastic fluororubber, a tetrafluoroethylene-hexafluoropropylene copolymer (ETFE), and a tetrafluoroethylene-hexafluoropropylene-vinylidene fluoride terpolymer (THV).

4. The pressure roller according to claim 1, wherein the fluororesin is made of a tetrafluoroethylene-perfluoroalkyl vinyl ether copolymer (PFA), tetrafluoroethylene-hexafluoropropylene copolymer (FEP), tetrafluoroethylene-perfluoromethyl vinyl ether copolymer (MFA) or tetrafluoroethylene-hexafluoropropylene-perfluoroalkyl vinyl ether terpolymer (EPA).

5. A pressure roller comprising:

a metal core, an elastic layer formed around said metal core, and a top layer provided over said elastic layer, said top layer having a thickness of not greater than 0.1 mm and being made of a fluororesin, wherein the fluororesin is a tetrafluoroethylene-perfluoroalkyl vinyl ether copolymer (PFA), tetrafluoroethylene-hexafluoropropylene copolymer (FEP), tetrafluoroethylene-perfluoromethyl vinyl ether copolymer (MFA) or tetrafluoroethylene-hexafluoropropylene-perfluoroalkyl vinyl ether terpolymer (EPA), and is mixed with at least one member selected from the group consisting of a polyamide, a polyester, a thermoplastic fluororubber, a tetrafluoroethylene-hexafluoropropylene copolymer (ETFE), and a tetrafluoroethylene-hexafluoropropylene-vinylidene fluoride terpolymer (THV).

6. The pressure roller of claim 5 wherein said elastic layer is made of a silicone rubber or a silicone sponge rubber.

* * * * *